(12) United States Patent
Chen

(10) Patent No.: US 7,380,960 B2
(45) Date of Patent: Jun. 3, 2008

(54) ILLUMINATION SYSTEM

(75) Inventor: Ko-Shun Chen, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 64 days.

(21) Appl. No.: 11/321,476

(22) Filed: Dec. 28, 2005

(65) Prior Publication Data

US 2006/0215404 A1 Sep. 28, 2006

(30) Foreign Application Priority Data

Mar. 24, 2005 (TW) .............................. 94109060 A

(51) Int. Cl.
*F21V 1/00* (2006.01)
(52) U.S. Cl. ...................... 362/236; 362/242; 362/227; 359/490; 359/495; 359/831
(58) Field of Classification Search ................ 362/248, 362/242, 234–235, 227; 359/490, 831, 495–496, 359/833, 839, 580, 590, 589
See application file for complete search history.

(56) References Cited

U.S. PATENT DOCUMENTS 6,609,795 B2 * 8/2003 Weber et al. ................. 353/20
6,932,478 B1 * 8/2005 Lin et al. ....................... 353/31
6,943,949 B2 * 9/2005 Sedlmayr ..................... 359/497
2004/0070970 A1 * 4/2004 Chang ......................... 362/234
2005/0270775 A1 * 12/2005 Harbers et al. ............. 362/231

FOREIGN PATENT DOCUMENTS

TW 580545 3/2004

* cited by examiner

*Primary Examiner*—Jong-Suk (James) Lee
*Assistant Examiner*—Julie A. Shallenberger
(74) *Attorney, Agent, or Firm*—J.C. Patents

(57) ABSTRACT

An illumination system includes a beam splitting unit, a first lamp, a second lamp and a reflective component. The beam splitting unit has a splitting interface. One of the first lamp, the second lamp and the reflective component is disposed at one side of the beam splitting interface, and the others are disposed at the other side of the splitting interface. Moreover, a first beam and a second beam are respectively provided by the first lamp and the second lamp. The beam splitting unit is adapted to pass through a portion of the first beam and the second beam and reflect the other portion of the first beam and the second beam. The reflective component, the first lamp and the second lamp are adapted to reflect the collected portions of the first beam and the second beam back to the beam splitting unit.

9 Claims, 12 Drawing Sheets

ILLUMINATION SYSTEM

CROSS-REFERENCE TO RELATED APPLICATION

This application claims the priority benefit of Taiwan application serial no. 94109060, filed on Mar. 24, 2005. All disclosure of the Taiwan application is incorporated herein by reference.

BACKGROUND OF THE INVENTION

1. Field of the Invention

The present invention relates to an illumination system, and more particularly to an illumination system having multiple lamps.

2. Description of Related Art

Referring to FIG. 1, a conventional illumination system 100 comprises a first lamp 110, a second lamp 120, and a reflective component 130. The first lamp 110 and the second lamp 120 are disposed oppositely each other and located on a same axis 50. The reflective component 130 is disposed between the first lamp 110 and the second lamp 120. The reflective component 130 has two reflective surfaces 132 and 134. The reflective surfaces 132 and 134 respectively have a 45 degree angle with the axis 50.

The first lamp 110 comprises a burner 112 and a parabola lampshade 114, and the second lamp 120 comprises a burner 122 and a parabola lampshade 124. The burners 112 and 122 are respectively adapted to provide a divergent beam The parabola lampshades 114 and 124 are adapted to converge the divergent beam into parallel beams 112a, 122a. The optical axes of the parallel beams 112a and 122a are parallel to the axis 50. Moreover, after being reflected at the reflective surfaces 132 and 134 of the reflective component 130, portions of the two parallel beams 112a and 122a are combined into a combined beam 140. The remaining portions of the parallel beams 112a and 122a are reflected by the parabola lampshades 114 and 124 back to the reflective component 130 and then reflected at the reflective surfaces 132 and 134 to combine into the combined beam 140.

In the above-described double-lamp illumination system 100, the burners 112 and 122 are relatively easily destroyed by overheating, as the parallel beams 112a and 122a repetitively pass through the burners 112 and 122, and directly irradiate the second lamp 120 and the first lamp 110. Furthermore, in case one of the lamps is broken, portions of images projected by a projector employing such an illumination system are dark.

Furthermore, lamps providing parallel beams, such as the lamps having parabola lampshades, can be used in the double-lamp illumination system 100, but lamps providing non-parallel beams, such as the lamps having elliptic lampshades, can not be used in the double-lamp illumination system 100. In addition, portions of the parallel beams provided by the double-lamp illumination system 100 can be divergent and cannot be effectively utilized. Thus, a brightness of the images projected by the projector employing a double-lamp illumination system 100 is decreased. Furthermore, because the volume of the double-lamp illumination system 100 is bulkiness, the projector employing the illumination system 100 can not achieve designing principles of miniaturization and light for electronic products.

SUMMARY OF THE INVENTION

It is an object of the present invention to provide an illumination system capable of improving a disadvantage of a conventional illumination system that is when one of the lamps is broken, portions of images projected by a projector employing the illumination system are dark.

It is another object of the present invention to provide an illumination system composed of simple optical components, thereby miniaturizing the illumination system.

It is still another object of the present invention to provide an illumination system capable of providing a high-luminance beam to increase the brightness of images projected by a projector employing the illumination system.

According to the above and other objects, the present invention provides an illumination system, comprising a beam splitting unit, a first lamp, a second lamp and a reflective component. One of the first lamp, the second lamp, and the reflective component is disposed at one side of a beam splitting interface of the beam splitting unit and the others are disposed at the other side of the beam splitting interface. The first lamp and the second lamp provide a first beam and a second beam respectively. The beam splitting unit is adapted to pass through one portion of the first beam and the second beam and reflect the other portion of the first beam and the second beam. The reflective component, the first lamp and the second lamp are adapted to reflect portions of the first beam and the second beam to the beam splitting unit. The illumination system according to the present invention has the beam splitting unit disposed on the transmitting path of the first beam and the second beam to combine a portion of the first beam and a portion of the second beam. The first lamp, the second lamp and the reflective component are disposed to collect the remaining portions of the first beam and the second beam, and further reflect the collected beams to the beam splitting unit. The first beam and the second beam have the same axis after being combined. Therefore, in case one of the lamps is broken, portions of images projected by the projector employing the illumination system are not dark.

The present invention also provides an illumination system, comprising a beam splitting unit, a first lamp, a second lamp and a third lamp, and the beam splitting unit has a beam splitting interface, the first lamp being disposed at one side of the beam splitting interface, the second lamp and the third lamp being disposed at the other side of the beam splitting interface. The first, the second and the third lamps are adapted to respectively provide a first, a second and a third beam, and the beam splitting unit is adapted to pass through one portion of the first, the second, and the third beams and reflect the other portion of the first, the second, and the third beams. At the same time, the first, the second, and the third lamps are adapted to reflect portions of the first, the second and the third beams back to the beam splitting unit. The third lamp is employed to replace the reflective component, consequently a beam having higher luminance to be obtained.

BRIEF DESCRIPTION OF THE DRAWINGS

The accompanying drawings are included to provide a further understanding of the invention, and are incorporated in and constitute as a portion of this specification. The drawings illustrate embodiments of the invention and, together with the description, serve to explain the principles of the invention.

DESCRIPTION OF THE EMBODIMENTS

Reference will now be made in detail to the three embodiments of the present invention, examples of which are illustrated in the accompanying drawings. The embodiments are described below in order to explain the present invention by referring to the figures.

Embodiment 1

Figure 1:
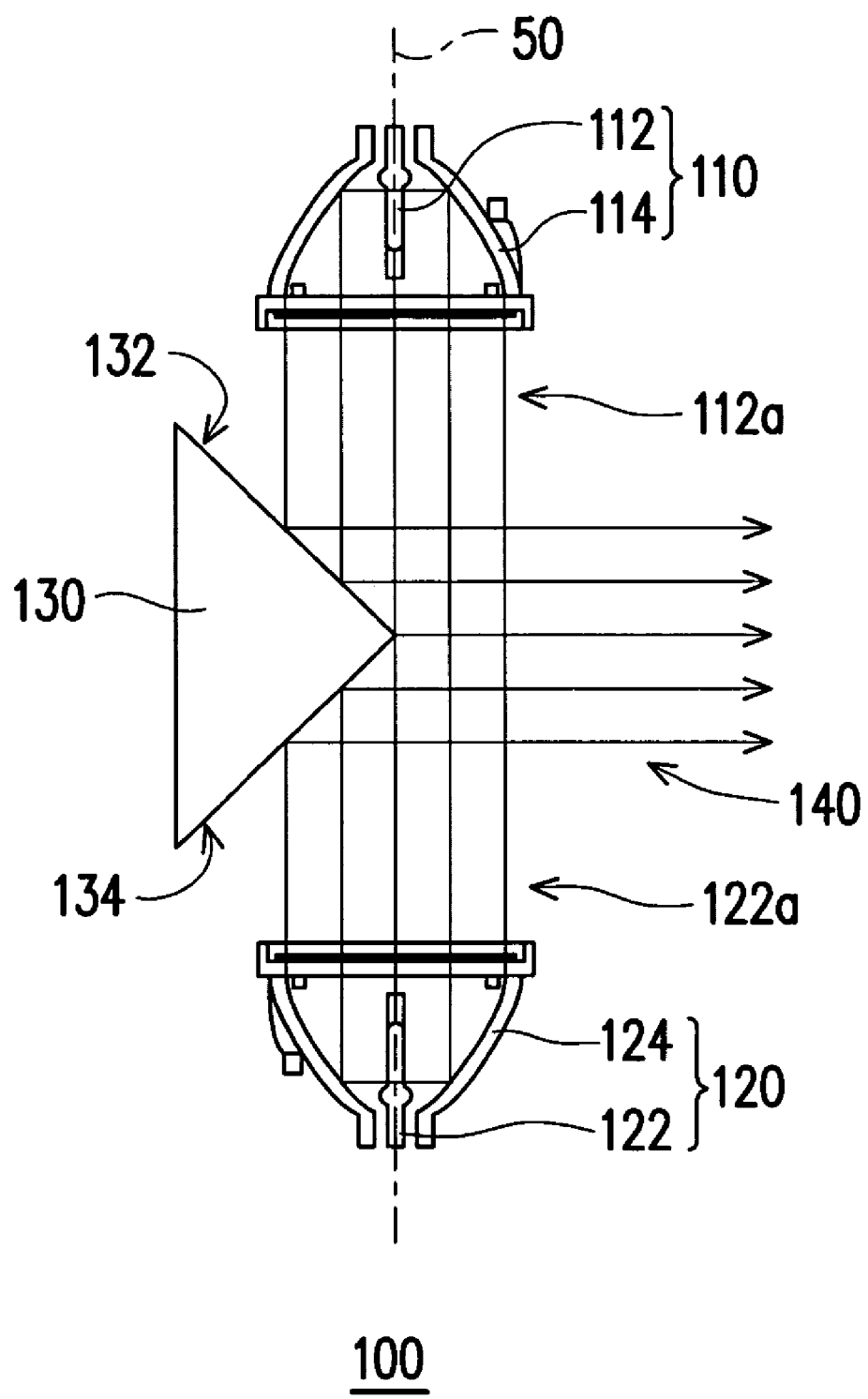
FIG. 1 is a schematic diagram of a conventional double-lamp illumination system.
Figure 2A:
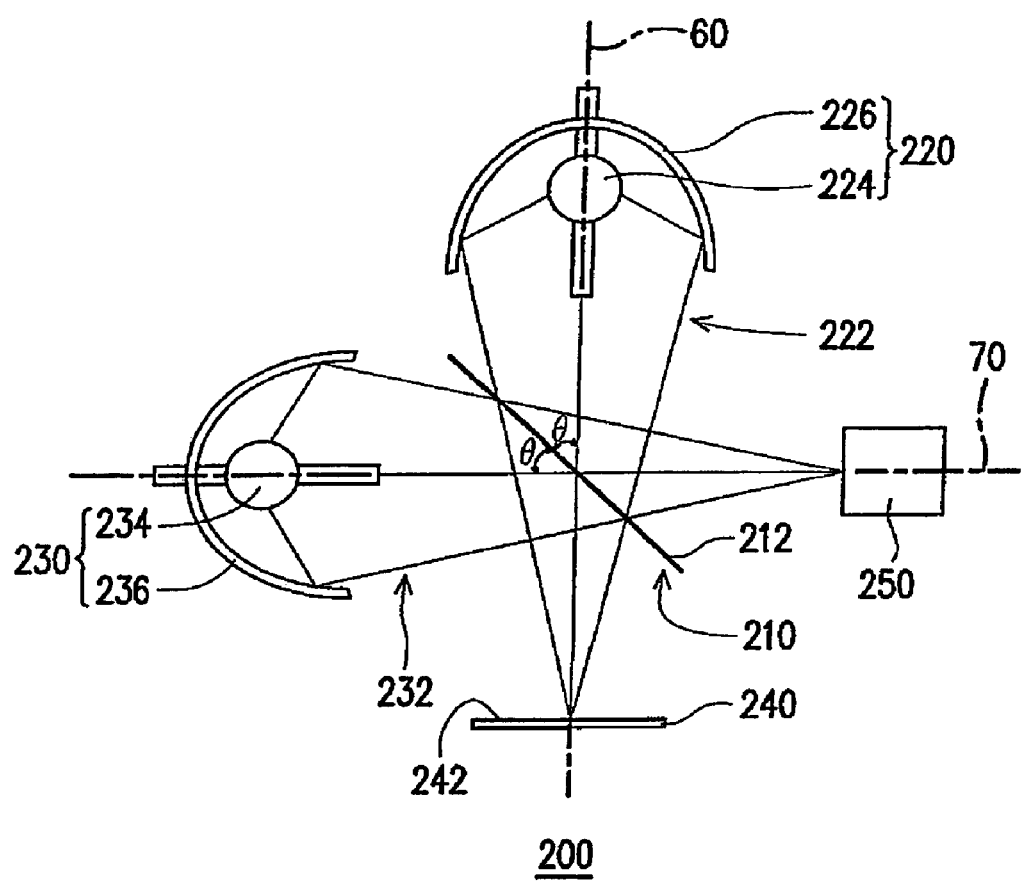
FIGS. 2A and 2B are schematic diagrams of illumination systems according to a first embodiment of the present invention.
Figure 2B:
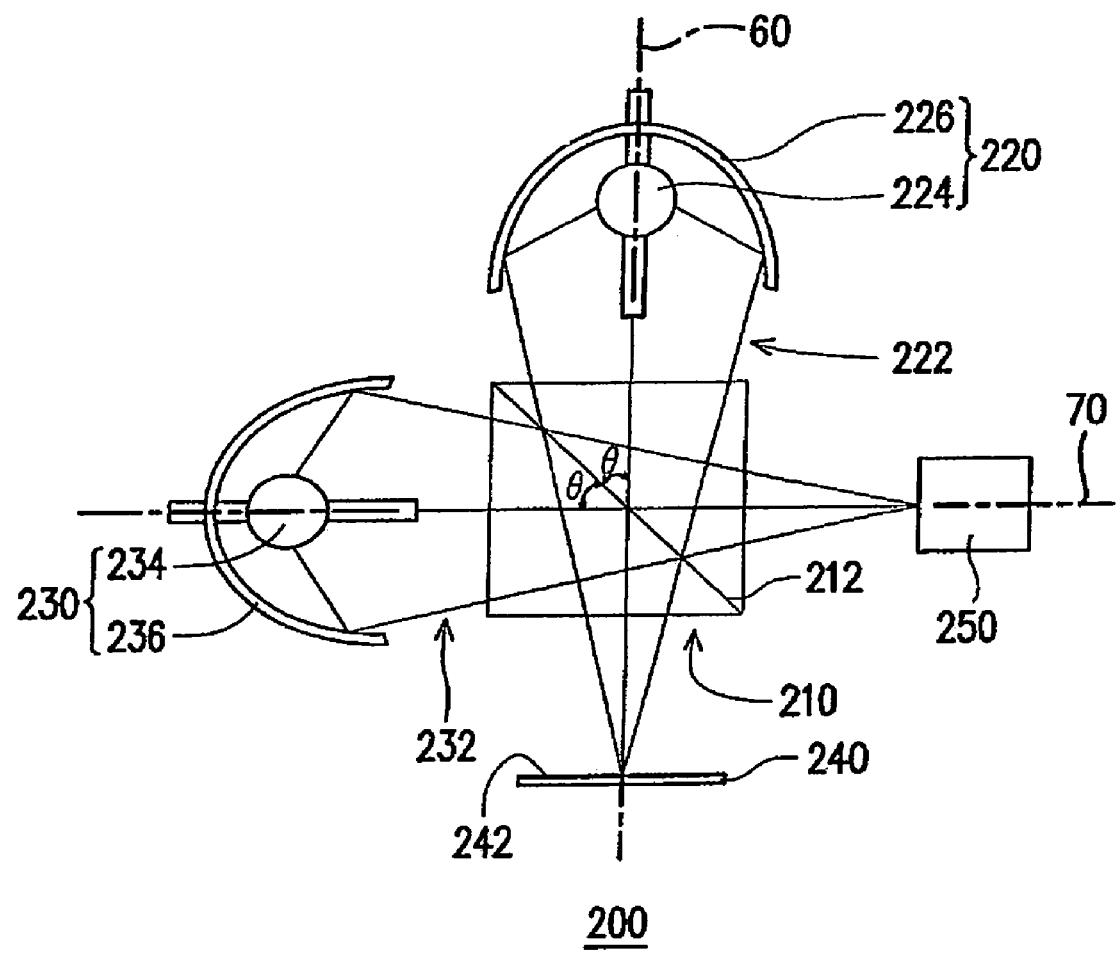

As shown in FIGS. 2A and 2B, an illumination system 200 according to the first embodiment comprises a beam splitting unit 210, a first lamp 220, a second lamp 230 and a reflective component 240. The beam splitting unit 210 has a beam splitting interface 212, the first lamp 220 is disposed at one side of the beam splitting interface 212, and the second lamp 230 and the reflective component 240 are disposed at the other side of the beam splitting interface 212. The first lamp 220 and the second lamp 230 are respectively adapted to provide a first beam 222 and a second beam 232, and the beam splitting unit 210 is adapted to pass through one portion of the first beam 222 and the second beam 232 and reflect the other portion of the first and the second beams 222, 232. The reflective component 240, the first lamp 220 and the second lamp 230 are adapted to reflect portions of the first beam 222 and the second beam 232 to the beam splitting unit 210.

For example, in the above-described illumination system 200, the reflective component 240 and the first lamp 220 are located on a first axis 60, the second lamp 230 is located on a second axis 70, and the beam splitting interface 212 of the beam splitting unit 210 is located at an intersection point of the first and the second axes 60, 70. The beam splitting unit 210 can be a beam splitter (as shown in FIG. 2A) or a beam splitting prism (as shown in FIG. 2B), an angle θ between the first axis 60 and the beam splitting interface 212 of the beam splitting unit 210 is equal to an angle θ between the second axis 70 and the beam splitting interface 212 of the beam splitting unit 210. In this embodiment, the angle θ is equal to 45 degree but not limited to 45 degree. Furthermore, in this embodiment, a distance between the intersection point of the first axis 60 and the second axis 70 and the first lamp 220 is equal to a distance between the intersection point of the first axis 60 and the second axis 70 and the second lamp 230.

The first lamps 220 includes a burner 224 and a lampshade 226, and the second lamp 230 includes a burner 234 and a lampshade 236. The burners 224, 234 are respectively disposed in the lampshades 226, 236. The burners 224, 234 are respectively adapted to provide a divergent light, and the lampshades 226 and 236 are adapted to converge the divergent lights into a first beam 222 and a second beam 232. Moreover, in this embodiment, the lampshades 226, 236 can be elliptic lampshades and adapted to converge the divergent lights provided by the burners 224, 234 into the first beam 222 and the second beam 232. The reflective component 240 for example is a flat mirror disposed at a focal point of the first beam 222.

The first beam 222 is divided into two portions by the beam splitting unit 210, one portion of the first beam 222 being reflected and the other portion of the first beam 222 passing through the beam splitting unit 210 and being transmitted to the reflective component 240. Moreover, the second beam 232 is divided into two portions by the beam splitting unit 210, one portion of the second beam 232 being reflected to the reflective component 240 and the other portion of the second beam 232 passing through the beam splitting unit 210.

The portion of the first beam 222 reflected by the beam splitting unit 210 and the portion of the second beam 232 passing through the beam splitting unit 210 are combined and the transmitting paths thereof overlap. Moreover, the portion of the second beam 232 reflected by the beam splitting unit 210 and the portion of the first beam 222 passing through the beam splitting unit 210 are reflected back to the splitting unit 210 by the reflective component 240. Thereafter, a portion of the beams reflected back to the beam splitting unit 210 pass through the beam splitting unit 210 to the first lamp 220, and the other portion is reflected back to the second lamp 230. The first lamp 220 and the second lamp 230 can reuse the collected portions of beams, as the lampshades 226 and 236 of the first lamp 220 and the second lamp 230 subsequently reflect the collected portions of beams back to the beam splitting unit 210 for reusing.

The illumination system 200 according to the embodiment further includes a light collecting component 250 located on the second axis 70. The light collecting component 250 and the first lamp 220 are disposed at one side of the beam splitting interface 212. The light collecting component 250 is an integrated rod, a lens array or any other optical component having an ability to collect the beams. The collecting component 250 is for example disposed at a focal point of the first and the second beams 222, 232 for collecting the combined first and second beams 222, 232, thus increasing the luminance of beams provided by the illumination system 200.

According to the illumination system 200 provided in the present invention, due to the substantially overlapping transmitting paths of the first and the second beams 222, 232 after being combined, the beams emitted by the illumination system 200 are relatively concentrated and have relatively high luminance, and consequently the image brightness projected by a projector adopting the same may be increased. Also due to the substantially overlapping transmitting paths of the first and the second beams 222, 232 after being combined, in case one of the lamps is broken-down, portions of images projected by the projector employing such an illumination system are not dark. Moreover, only a portion of the first beam 222 illuminates the second lamp 230, and a portion of the second beam 232 illuminates the first lamp 220, thus the disadvantage of the conventional double-lamp illumination system 100 that the burners 112, 122 are easily destroyed by overheating substantially to be improved.

In this embodiment, different coating layers 242 are coated on the reflective component 240 for adjusting color temperature and isolating the infrared and ultraviolet light. The burners 224, 234 therefore are avoided of being overheated, and the possibility of the burners 224, 234 being damaged is subsequently decreased. Moreover, the ratio of transmission to reflection of the beam splitting unit 210 is controlled to increase the luminance of the beam emitted by the illumination system 200, and the temperature around the first lamp 220 and second lamp 230 is controlled to further prevent the burners 224, 234 from being destroyed by overheating. Also, the small structure of the illumination system 200 miniaturizes a volume of the projector.

Figure 3A:
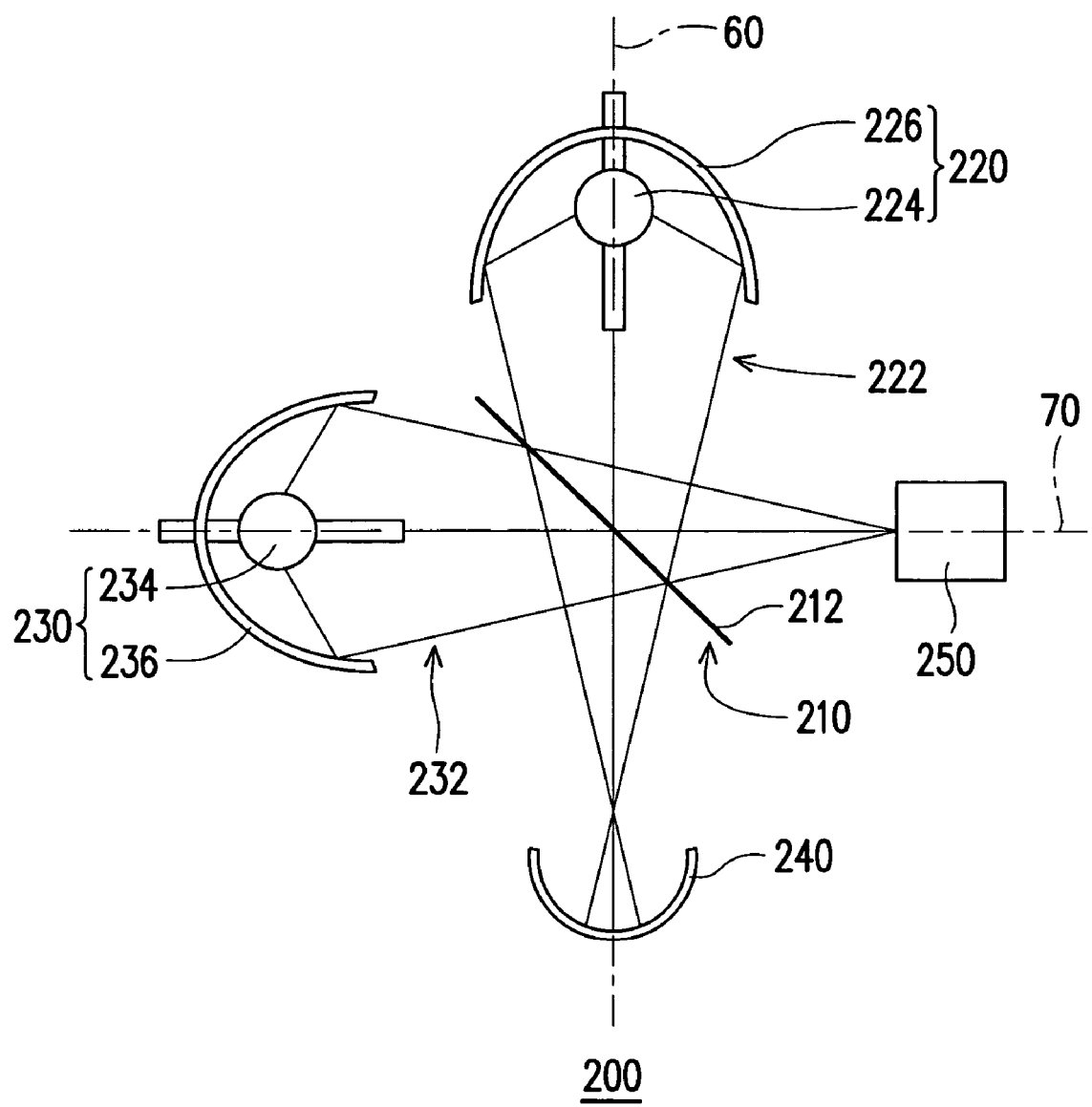
FIGS. 3A and 3B are schematic diagrams of illumination systems according to a first embodiment of the present invention.
Figure 3B:
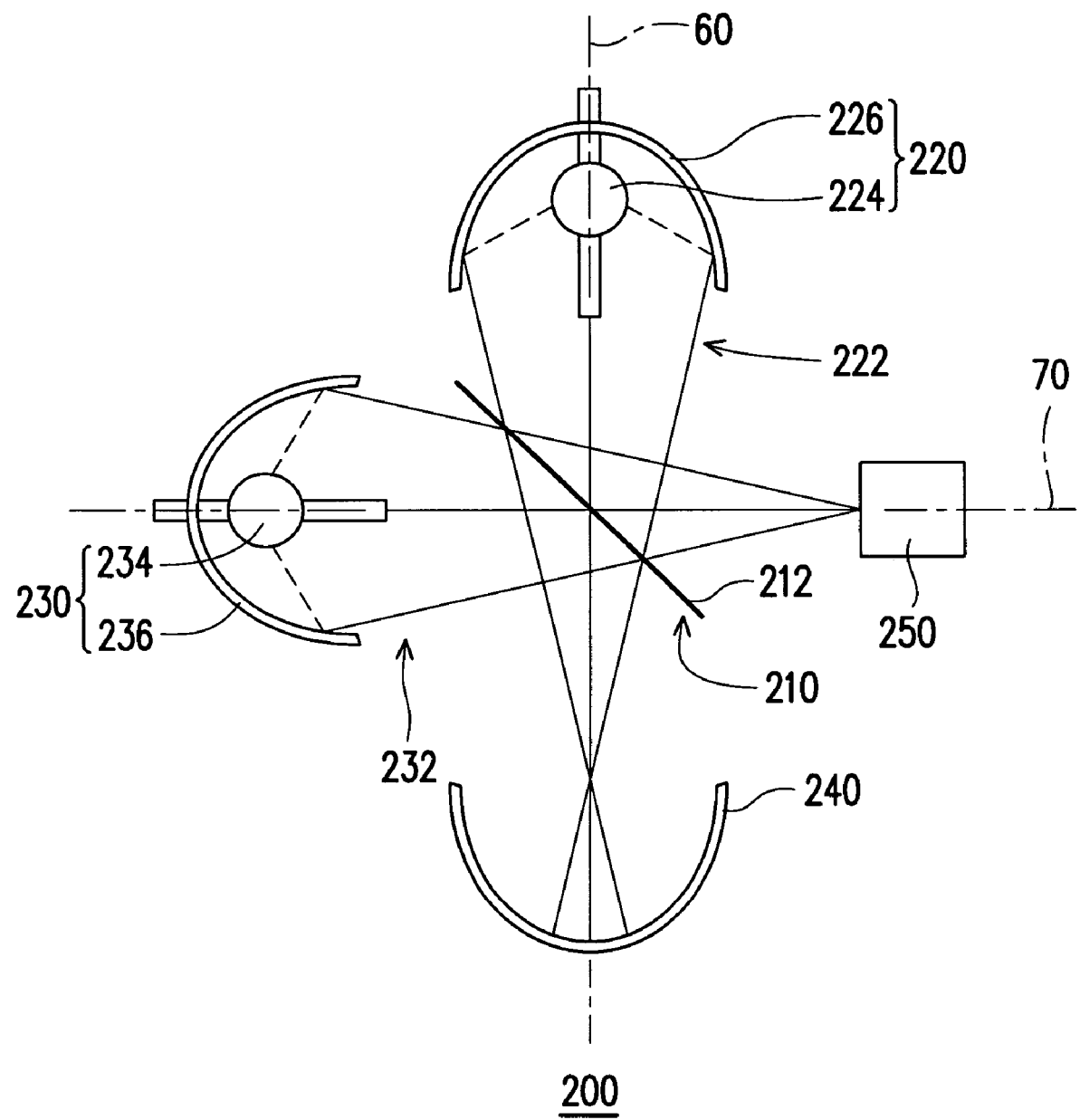

Referring to FIGS. 3A and 3B, the reflective component 240 in the embodiment may be, but not limited to be, the above-described flat mirror (as shown in FIG. 2A). Different reflective components can be selected as the reflective component 240 according to the lampshades selected. For example, the lampshade is elliptic, and the reflective is a flat mirror or a spherical mirror (as shown in FIG. 3A), which is able to disperse the heat from the first beam 222 and the second beam 232 to decrease the temperature around the first lamp 220 and the second lamp 230. Furthermore, the reflective component 240 is an elliptic mirror (as shown in FIG. 3B), having a curvature the same with the lampshade 226 of the first lamp 220, and the reflective component 240 is disposed at a conjugate point of the first lamp 220 to increase the luminance of the beam emitted by the illumination system 200.

Figure 4A:
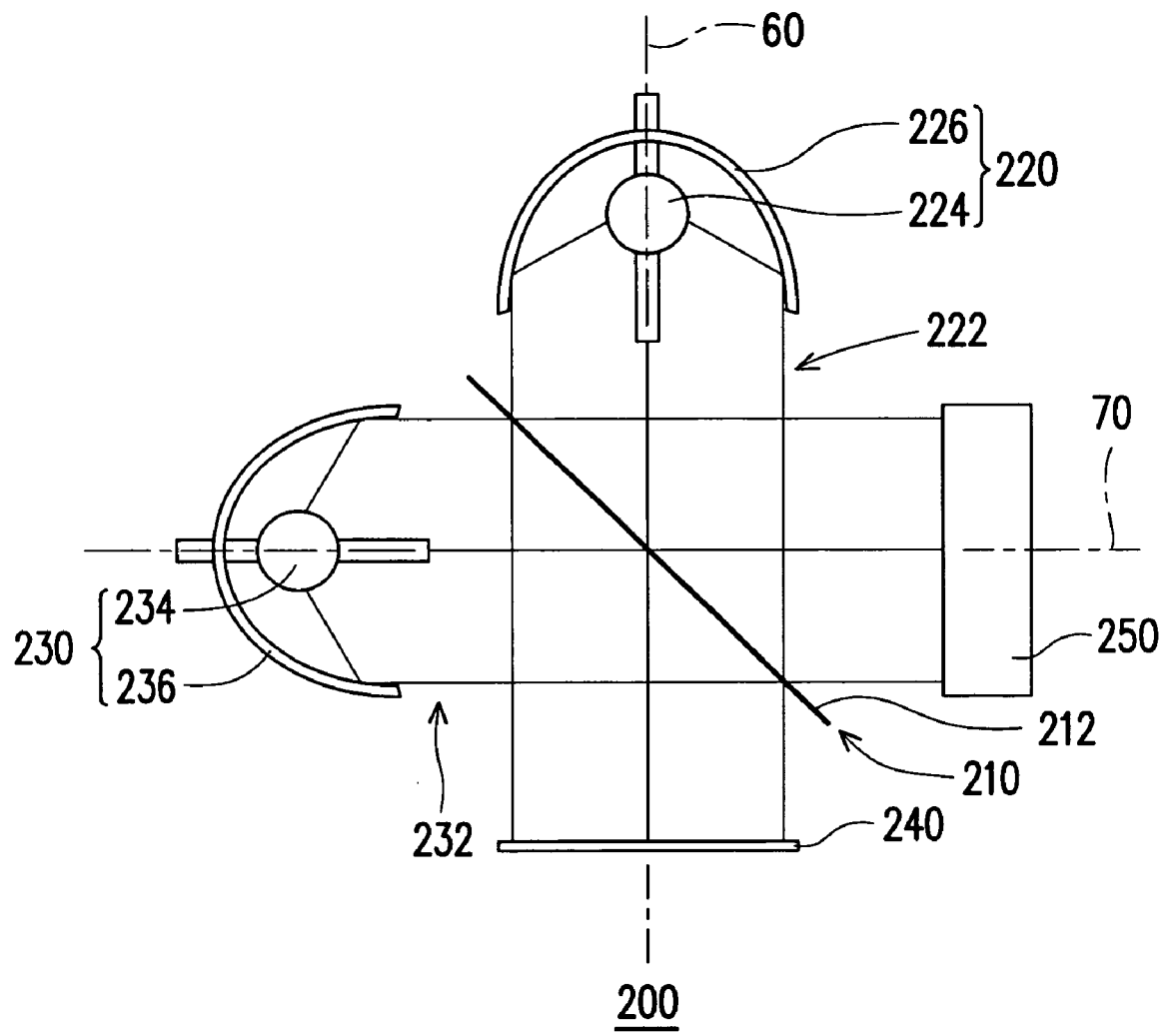
FIGS. 4A to 4C are schematic diagrams of illumination systems according to a first embodiment of the present invention.
Figure 4B:
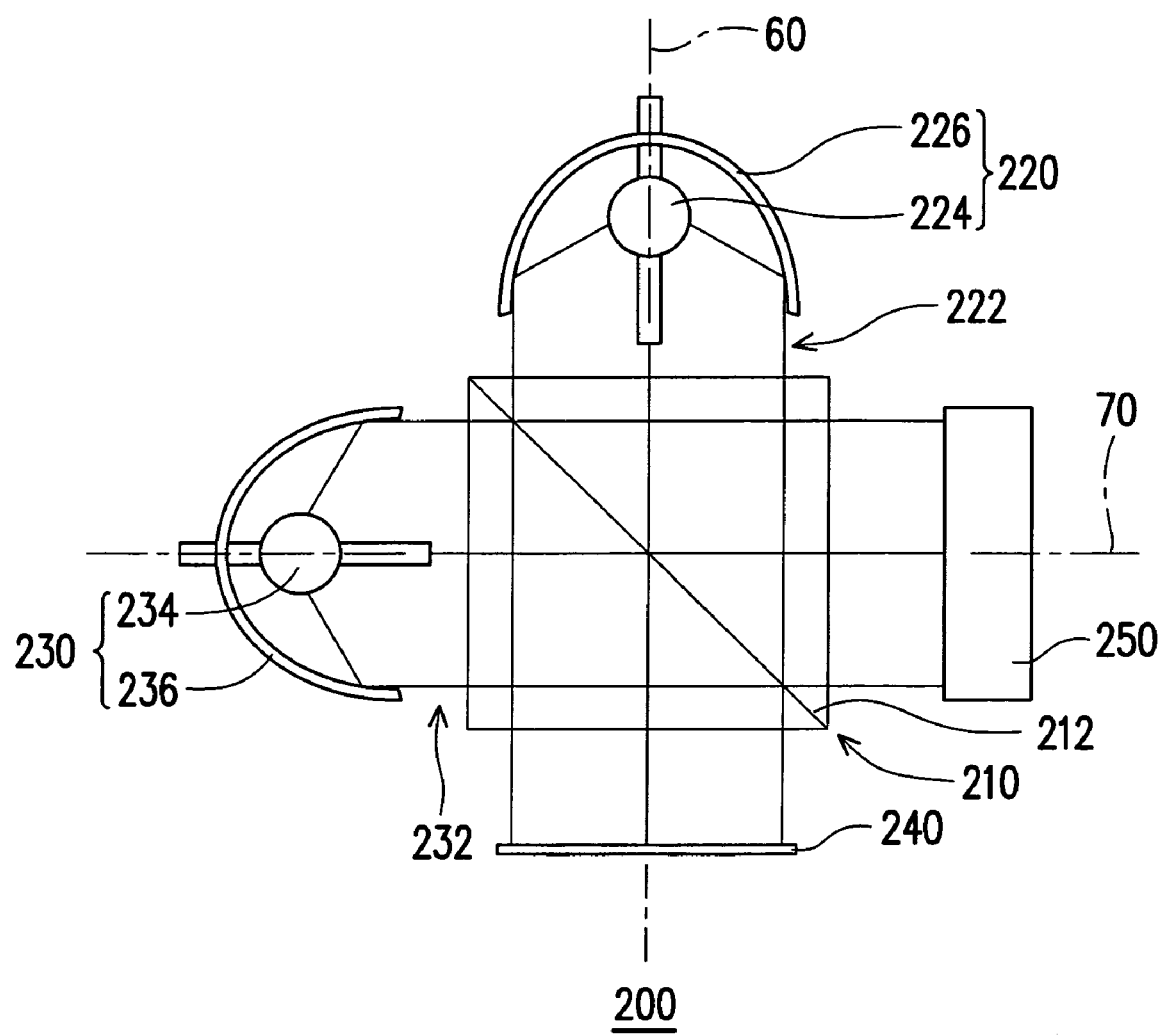

In addition, referring to FIGS. 4A and 4B, in this embodiment, the lampshades 226 and 236 are parabola lampshades (as shown in FIGS. 4A and 4B) or the above-described elliptic lampshades (shown as FIG. 2A). Such parabola lampshades convert the divergent lights provided by the burners 224, 234 into parallel beams. In another words, different types of lampshades 226 of the illumination system 200 are selected in this embodiment to provide parallel beams or unparallel beams to the projectors for parallel beams or unparallel beams. The reflective component 240 shown in the FIGS. 4A and 4B is a parabola mirror, or a flat mirror.

Figure 4C:
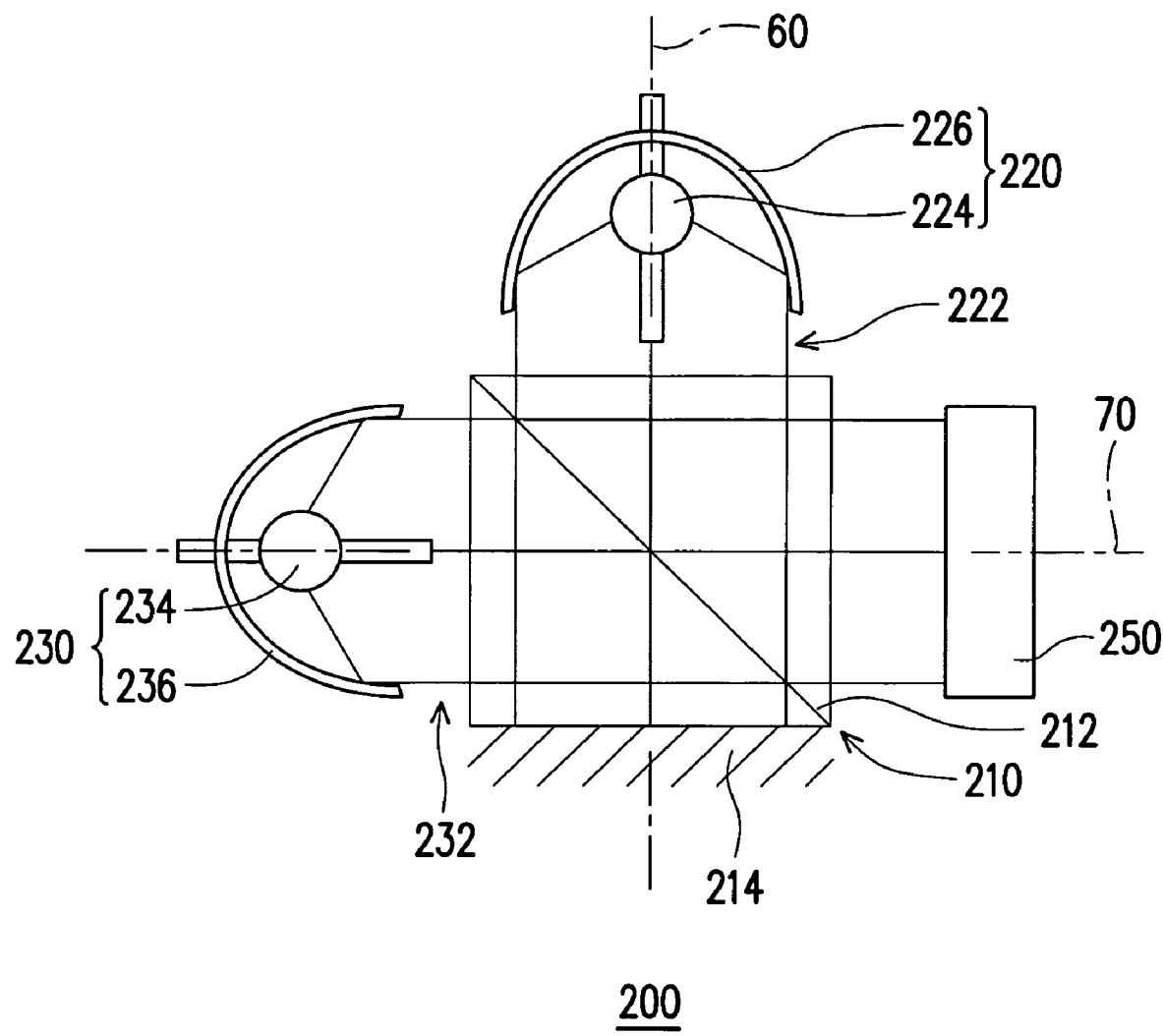

Referring to FIG. 4C, in one embodiment, the beam splitting unit 210 is a beam splitting prism having a coating layer 214 coated thereon. The coating layer 214 serves as a reflective component for reflecting a portion of the first beam 222 and a portion of the second beam 232.

Figure 5A:
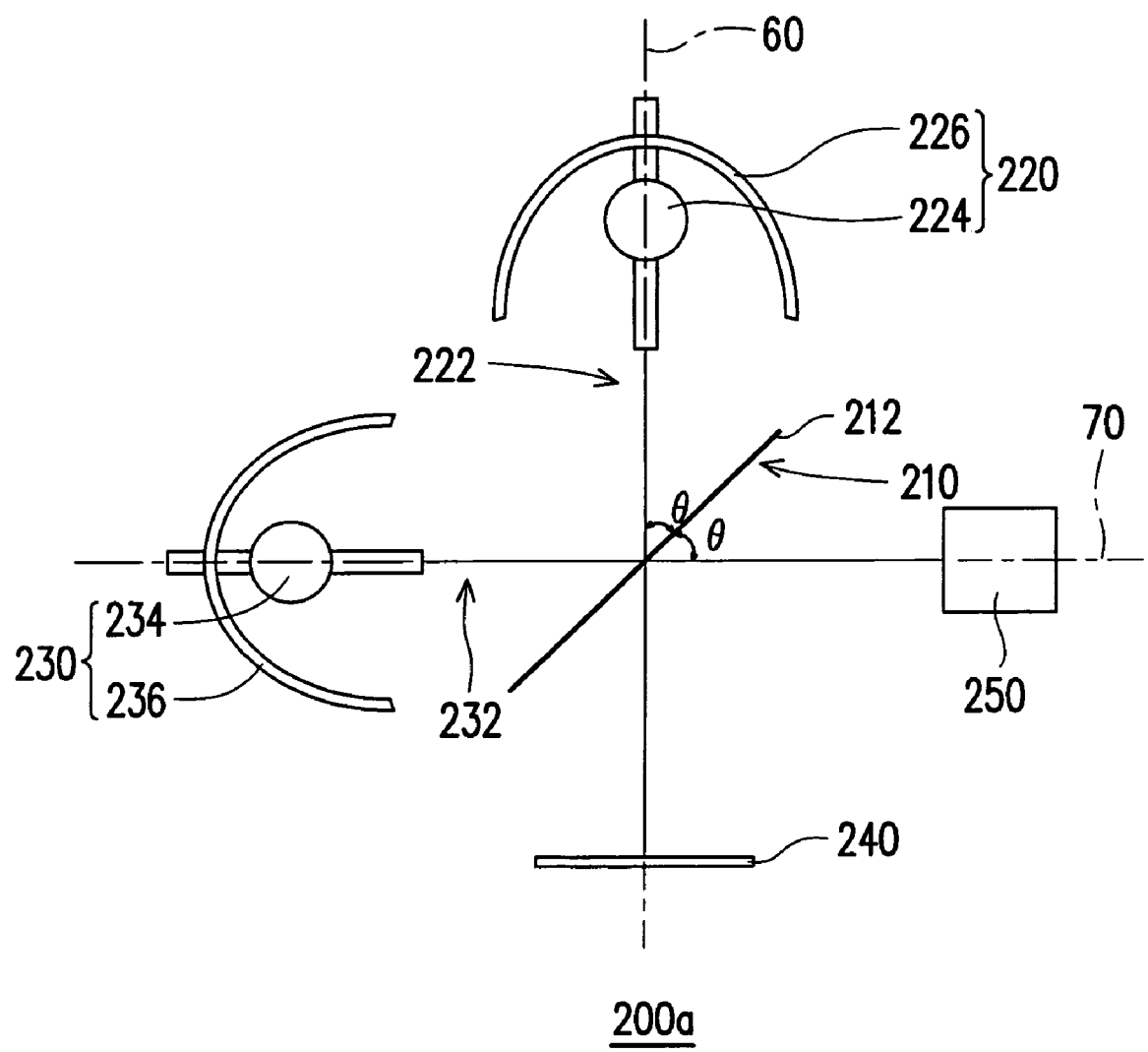
FIGS. 5A and 5B are schematic diagrams of illumination systems according to a first embodiment of the present invention.
Figure 5B:
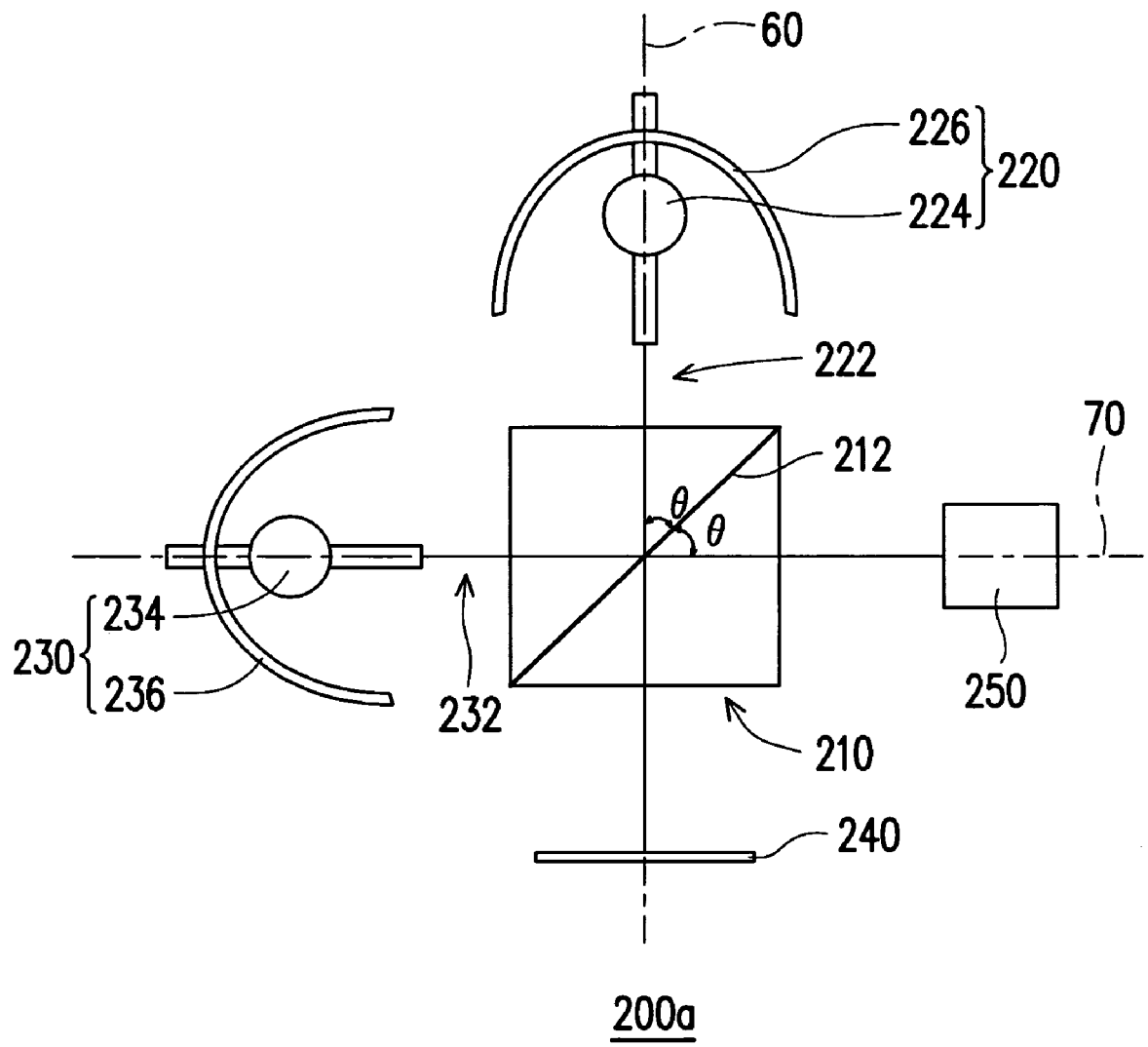

Referring to FIGS. 5A and 5B, in the illumination system 200 (as shown in FIG. 2A), the second lamp 230 and the reflective component 240 are disposed at one side of the beam splitting interface 212, and the first lamp 220 is disposed at the other side of the beam splitting interface 212. However, it is also applicable in this embodiment to dispose the first lamp 220 and the second lamp 230 at one side of the beam splitting interface 212 and dispose the reflective component 240 at the other side of the beam splitting interface 212.

According to this embodiment, in the illumination system 200a, the second beam 232 is transmitted to the beam splitting unit 210, and a portion of the second beam 232 is reflected to the first lamp 220 for reuse, and the other portion of the second beam 232 passes through the beam splitting unit 210 to the first lamp 220. Also, the first beam 222 is transmitted to the beam splitting unit 210, a portion of the first beam 222 is reflected to the second lamp 230 for reuse, and the other portion of the first beam 222 passes through the beam splitting unit 210 to the reflective component 240 and is further reflected back to the beam splitting unit 210 by the reflective component 240.

According to the above, a portion of the first beam 222 reflected to the beam splitting unit 210 by the reflective component 240 passes through the beam splitting unit 210 to the first lamp 220 for reuse, and the other portion is reflected by the beam splitting unit 210 to combine with a portion of the second beam 232 passing through the beam splitting unit 210.

Second Embodiment

Figure 6:
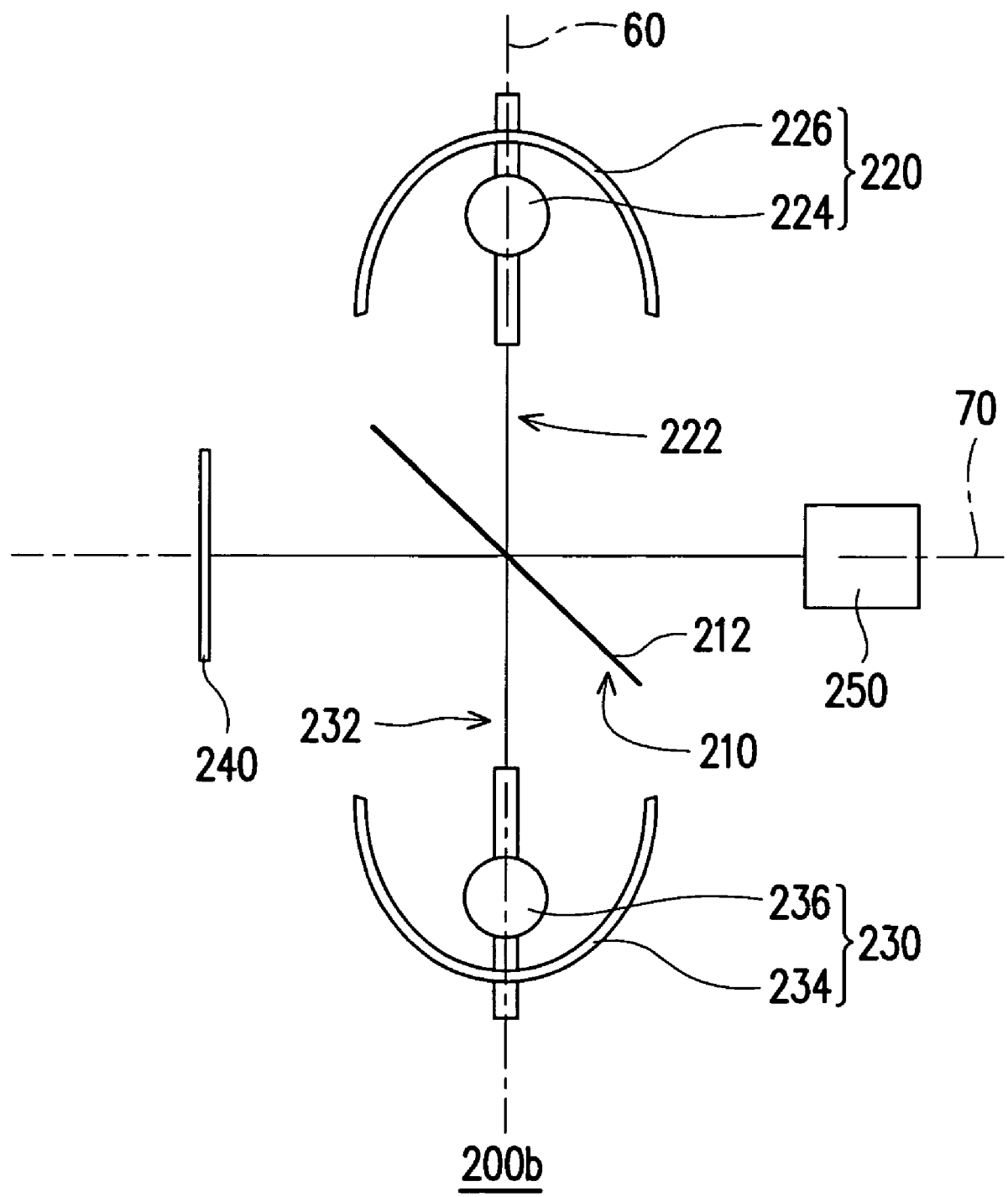
FIG. 6 is a schematic diagram of an illumination system according to a second embodiment of the present invention.

Referring to FIG. 6, the illumination system 200b, according to the embodiment, is similar to the illumination system 200 (as shown in FIG. 2A). Differences are illustrated below. In the illumination system 200b, the positions of the second lamp 230 and the reflective component 240 in the illumination system 200 is exchanged such that the second lamp 230 and the reflective component 240 are respectively located on the first axis 60 and the second axis 70.

In this embodiment, a portion of the first beam 222 provided by the first lamp 220 is reflected by the beam splitting unit 210, and the other portion passes through the beam splitting unit 210 to the second lamp 230 for reuse. Furthermore, a portion of the second beam 232 provided by the second lamp 230 is reflected by the beam splitting unit 210, and the other portion of the second beam 232 passes through the beam splitting unit 210.

One portion of the second beam 232 passing through the beam splitting unit 210 is transmitted to the first lamp 220 for reuse. Meanwhile, the other portion of the second beam 232 reflected by the beam splitting unit 210 is reflected by the reflective component 240 back to the beam splitting unit 210. Thereafter, a portion of the second beam 232 reflected by the reflective component 240 back to the beam splitting unit 210 passes through the beam splitting unit 210 for being combined with the portion of the first beam 222 reflected by the beam splitting unit 210. The other portion of the second beam 232 reflected by the reflective component 240 back to the beam splitting unit 210 is reflected back to the second lamp 230 for reuse.

The advantages of the illumination system 200b of this embodiment are similar to those of the illumination system 200 and are not to be repeated herein. Moreover, in this embodiment, the beam splitting unit 210 can be a beam splitter or a beam splitting prism, and the lampshades 226, 236 can be elliptic lampshades or parabola lampshades, and the reflective component 240 can be a flat mirror, a spherical mirror, an elliptic mirror or a parabola mirror.

Third Embodiment

Figure 7:
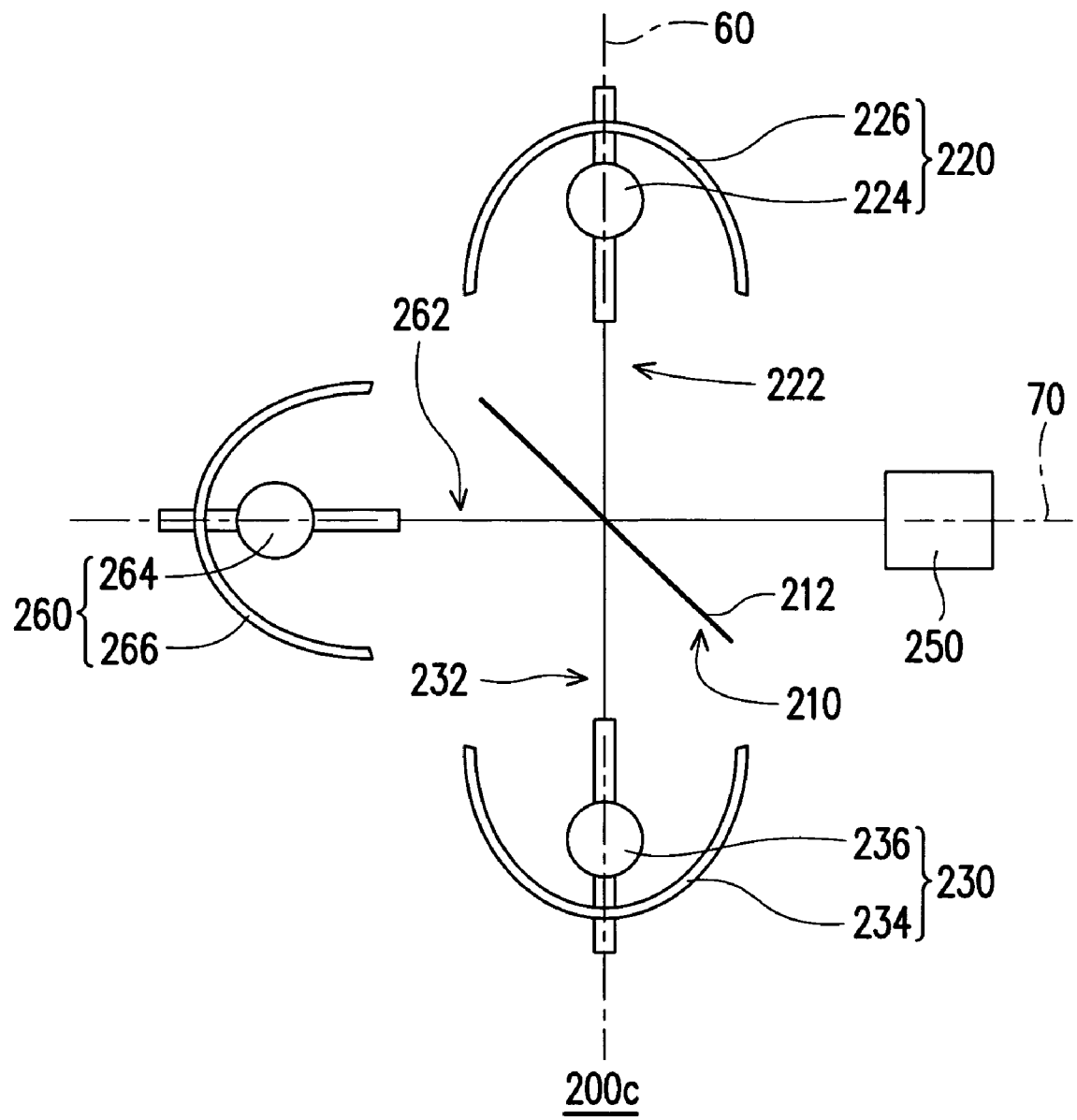
FIG. 7 is a schematic diagram of an illumination system according to a third embodiment of the present invention.

Comparing FIG. 7 with FIG. 5, the illumination system 200c is different from the illumination system 200a shown in FIG. 5 by replacing the reflective component 240 with a third lamp 260. In other words, the illumination system 200c of this embodiment has three lamps.

In this embodiment, one portion of the first beam 222 provided by the first lamp 220 is reflected by the beam splitting unit 210, and the other portion of the first beam 222 passes through the beam splitting unit 210 to the second lamp 230 for reuse. Also, one portion of the second beam 232 provided by the second lamp 230 is reflected by the beam splitting unit 210, and the other portion of the second beam 232 passes through the beam splitting unit 210.

The portion of the second beam 232 passing through the beam splitting unit 210 is transmitted to the first lamp 220 for reuse. Meanwhile, the portion of the second beam 232 reflected by the beam splitting unit 210 is reused by the third lamp 260. Moreover, one portion of a third beam 262 provided by the third lamp 260 passes through the beam splitting unit 210, and the other portion is reflected by the beam splitting unit 210, the portion of the third beam 262 passing through the beam splitting unit 210 is combined with the portion of the first beam 222 reflected by the beam splitting unit 210, and the portion of the third beam 262 reflected by the beam splitting unit 210 is reused by the second lamp 230.

Including a first, a second, and a third lamps 220, 230, 260, the illumination system 200c of the embodiment therefore provide high-luminance beams for increasing the brightness of the images projected by the projector. In the embodiment, the beam splitting unit 210 can be a beam splitter or a beam splitting prism, and the lampshades 226, 236, 266 can be elliptic or parabola lampshades.

In view of the above, the illumination systems according to the present invention, have at least the advantages as described below:
1. Because the first beam and the second beam have an identical axis after the moment of being combined, the combined beam is relatively concentrated and high in luminance, thus increasing the brightness of the images projected by the projector, in case one of the lamps is broken-down, portions of images projected by the projector employing such an illumination system are not dark;
2. The illumination systems according to the present invention can provide parallel beams or unparallel beams to the projectors for parallel beams or unparallel beams;
3. The structures of the illumination systems according to the present invention are relatively small, thus the volume of the projector thereof can be miniaturized;
4. The illumination systems according to the present invention employ three lamps, therefore a higher luminance are provided and the brightness of the images projected by the projector is further increased.

The other modifications and adaptations of the above-described embodiments of the present invention are made to meet particular requirements. This disclosure is intended to exemplify the invention without limiting the scope of this disclosure. All modifications that incorporate the invention disclosed in the embodiment are to be construed as coming within the scope of the appended claims or the range of equivalents to which the claims are entitled.

What is claimed is:

1. An illumination system, having a first axis and a second axis intersecting said first axis at an intersection point, comprising:
   a beam splitting unit, having a beam splitting interface;
   a first lamp, adapted to provide a first beam;
   a second lamp, adapted to provide a second beam;
   a light collecting component; and
   a reflective component, wherein two of said first lamp, said second lamp, said light collecting component, and said reflective component are disposed at one side of a beam splitting interface and located on said first axis and said second axis respectively, said others are disposed at the other side of said beam splitting interface and located on said first axis and said second axis respectively, said first axis and said second axis form an included angle, 0 degrees<the included angle<180 degrees, said beam splitting unit allows a portion of said first beam and a portion of said second beam to pass through and reflects the other portion of said first beam and the other portion of said second beam according to the ratio of transmission to reflection of the beam splitting unit, the color of the portion of the first beam passing through the beam splitting unit and that of the other portion of the first beam reflected by the beam splitting unit are the same, the color of the portion of the second beam passing through the beam splitting unit and that of the other portion of the second beam reflected by the beam splitting unit are the same, said reflective component, said first lamp, and said second lamp reflect portions of said first beam and said second beam from said beam splitting unit back to said beam splitting unit, and said reflective component has a coating layer coated thereon for filtering out infrared and ultraviolet light from said first beam and second beam.

2. The illumination system according to claim 1, wherein said second lamp and said first lamp are located on said first axis, said reflective component and said light collecting component are located on said second axis, said light collecting component and said first lamp are disposed at one side of said beam splitting unit, and said beam splitting interface of said beam splitting unit is disposed at said intersection point of said first and said second axes, wherein an angle between said first axis and said beam splitting interface is equal to an angle between said second axis and said beam splitting interface.

3. The illumination system according to claim 1, wherein said reflective component and said first lamp are located on said first axis, said second lamp and the light collecting component are located on said second axis, said light collecting component and said first lamp are disposed at one side of said beam splitting unit, and said beam splitting interface of said beam splitting unit is disposed at said intersection point of said first and said second axes, wherein an angle between said first axis and said beam splitting interface is equal to an angle between said second axis and said beam splitting interface.

4. The illumination system according to claim 1, wherein said first lamp and said second lamp respectively comprises:
   a burner, adapted to provide a divergent light; and
   a lampshade, wherein said burner is disposed in said lampshade, said lampshade being adapted to convert said divergent light into said first and said second beams.

5. The illumination system according to claim 4, wherein said lampshade comprises an elliptic lampshade or a parabola lampshade.

6. The illumination system according to claim 1, wherein said beam splitting unit comprises a beam splitter.

7. The illumination system according to claim 1, wherein said beam splitting unit comprises a beam splitting prism.

8. The illumination system according to claim 7, wherein said reflective component is disposed on said beam splitting prism, and said reflective component is a coating layer thereon.

9. The illumination system according to claim 1, wherein said reflective component is selected from a group consisting of a flat mirror, a spherical mirror, an elliptic mirror and a parabola mirror.

* * * * *